Patented Apr. 3, 1951

2,547,905

UNITED STATES PATENT OFFICE 2,547,905

2-VINYLTHIOPHENE FROM THIOPHENE BY CHLOROETHYLATION AND DEHYDROHALOGENATION

William S. Emerson and Tracy M. Patrick, Jr., Dayton, Ohio, assignors to Monsanto Chemical Company, St. Louis, Mo., a corporation of Delaware No Drawing. Application March 23, 1950, Serial No. 151,542

3 Claims. (Cl. 260—329)

This invention relates to a new and useful method of preparing 2-vinylthiophene.

The vinylthiophenes are known chemical compounds having been prepared previously by the reduction of 2-acetothienone to the alcohol with aluminum isopropoxide, and then dehydrating the resulting alcohol to vinylthiophene.

The purpose of the present invention is to provide a new and more practicable method of preparing vinylthiophenes. A further purpose is to provide a method of preparing 2-vinylthiophene from thiophene by a simple, direct procedure. Further purposes will be apparent from the following description of the new process.

It has now been found that 2-vinylthiophene can be prepared from thiophene by reaction with acetaldehyde in the presence of concentrated hydrochloric acid, followed by treatment with approximately a stoichiometric proportion of a tertiary amine. The mechanism of reaction is believed to involve a substitution of the acetaldehyde on a carbon atom adjacent the sulfur atom of the thiophene, with the conversion to the chloroethyl group either simultaneously or subsequently, and thereafter dehydrohalogenation in the presence of the tertiary amine. The two or three steps involved are all parts of the same chemical reaction which takes place entirely in liquid phase without the separation of any intermediates. The separation of intermediate haloethylthiophene appears to be impossible, because of the instability of that compound.

The reaction is initiated by mixing thiophene and a concentrated halo acid, particularly hydrochloric acid, and acetaldehyde or a polymer thereof, for example, paraldehyde. The first stage of the reaction is conducted under refrigerated conditions, for example by the cooling of the reaction vessel by immersion in an ice-bath to remove the evolved heat of reaction. During the reaction a stream of hydrogen halide is passed through the reaction mixture. In general the reaction is complete in 20 to 120 minutes, depending upon the temperature and rate of heat dissipation. At this stage, a non-aqueous layer is separated from the reaction mass. After washing this organic layer with water at temperatures between 0 and 10° C., it is mixed with the tertiary amine, which preferably contains a substance which inhibits olefinic polymerization. Suitable polymerization inhibitors which may be used are hydroquinone, α-nitroso-β-naphthol and t-butylcatechol. The reaction mixture is then permitted to stand without heating until the reaction is substantially complete. The resulting liquid reaction product may then be distilled and the fraction boiling between 62 and 67° C. at 50 mm. pressure separated as a crude 2-vinylthiophene. By distillation in the presence of a polymerization inhibitor pure 2-vinylthiophene may be separated.

The intermediate organic liquid to which the tertiary amine was added is very unstable and should be kept under refrigerated conditions and should be dehydrohalogenated as quickly as possible. The described method for dehydrohalogenation is believed to be a critical part of the invention, since other methods have resulted in complete failure. For example, an attempt to pyrolyze intermediate products to vinylthiophene in a tube furnace packed with calcium sulfate resulted in the formation of tarry by-products which completely blocked the furnace; no vinylthiophene was detected. Furthermore, an attempted reaction with an alcoholic solution of sodium hydroxide by another conventional dehydrohalogenating treatment produced 2-(α-ethoxyethyl) thiophene, no vinylthiophene being recovered.

Further details of the process are set forth with respect to the following specific examples.

Example 1

A glass reaction vessel was charged with 176 parts by weight of paraldehyde, 300 parts of concentrated hydrochloric acid and 336 parts of thiophene. The reaction vessel was immersed in a mixture of salt and ice and cooled to less than 10° C. A stream of gaseous hydrogen chloride was passed into the reaction mixture over a period of 35 minutes, during which time the temperature of the reaction mixture remained between 10 and 13° C., at this time the mixture was saturated with hydrogen chloride. The reaction mixture was then poured into crushed ice and the resulting two liquid phases were separated. The organic fraction was washed three times with equal volumes of ice water. The organic fraction was then mixed gradually with 316 parts by weight of pyridine containing two parts of α-nitroso-β-naphthol while the reaction vessel was cooled. When all of the pyridine had been added, the mixture was allowed to stand for one and one-half hours before distillation. Three fractions were collected at successively lower pressures, the last two in the presence of α-nitroso-β-naphthol.

1. Up to 70° at 175 mm. pressure.
2. Up to 82° at 100 mm. pressure.
3. Up to 125° at 50 mm. pressure.

These fractions were combined and poured into a mixture of ice and 400 parts by weight of concentrated hydrochloric acid. The organic layer was separated and washed with very dilute hydrochloric acid and then with very dilute ammonia, after which it was carefully dried. Upon fractionation a substantial fraction was collected at 50 mm. pressure between temperatures of 65° and 67° C. The product was identified as 2-vinylthiophene.

*Example 2*

The procedure of Example 1 was repeated except that tributylamine was used for the dehydrochlorination. The product recovered was identified as vinylthiophene.

*Example 3*

The procedure of Example 1 was duplicated, except quinoline was used in the dehydrochlorination. The product recovered was identified as 2-vinylthiophene.

*Example 4*

The procedure of Example 1 was repeated, except that the α-nitroso-β-napthol was used as an inhibitor only in the distillation step.

This application is a continuation-in-part of application Serial No. 745,250, filed May 1, 1947.

The invention is defined by the following claims.

We claim:

1. A method of preparing 2-vinylthiophene which comprises reacting thiophene and acetaldehyde in the presence of an excess of a hydrogen halide, adding approximately a stoichiometric proportion of a tertiary amine, and separating the 2-vinylthiophene by distillation in the presence of an olefinic polymerization inhibitor.

2. A method of preparing 2-vinylthiophene which comprises mixing thiophene and acetaldehyde in approximately stoichiometric proportions in the presence of an excess of hydrochloric acid at temperatures below 20° C., adding a tertiary amine in approximately a stoichiometric proportion, and separating the 2-vinylthiophene by distillation in the presence of an olefinic polymerization inhibitor.

3. A method of preparing 2-vinylthiophene which comprises mixing approximately stoichiometric proportions of thiophene and paraldehyde in the presence of an excess of concentrated hydrochloric acid, introducing hydrogen chloride into the reaction mixture while maintaining the temperature below 20° C., adding approximately a stoichiometric proportion of pyridine, and distilling the product in the presence of an olefinic polymerization inhibitor.

WILLIAM S. EMERSON.
TRACY M. PATRICK, Jr.

REFERENCES CITED

The following references are of record in the file of this patent:

UNITED STATES PATENTS

| Number | Name | Date |
|---|---|---|
| 2,453,086 | Caesar | Nov. 2, 1948 |
| 2,492,663 | Schick | Dec. 27, 1949 |

OTHER REFERENCES

Organic Reactions, vol. 1, pages 63 to 90, Wiley, New York, 1942.

Frank, J. Am. Chem. Soc. 68, 1365–1368 (1946).

Emerson, J. Org. Chem. 13, 729–734 (1948).